Figure 1:
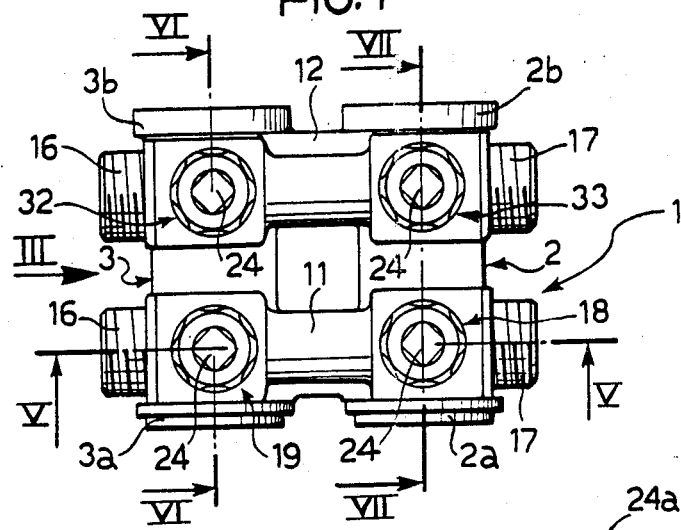

United States Patent [19]

Giordano

[11] Patent Number: 4,890,648

[45] Date of Patent: Jan. 2, 1990

[54] DISTRIBUTION AND SHUT-OFF DEVICE FOR HYDRAULIC SYSTEMS, PARTICULARLY FOR DOMESTIC WATER SYSTEMS

[76] Inventor: Vincenza Giordano, Via S. Crocifissa di Rosa 3, Brescia, Italy

[21] Appl. No.: 252,406

[22] Filed: Oct. 3, 1988

[30] Foreign Application Priority Data

Oct. 13, 1987 [IT] Italy .................. 67860 A/87

[51] Int. Cl.⁴ ........................................... F16K 11/20
[52] U.S. Cl. ................................... 137/594; 137/887
[58] Field of Search ............... 137/594, 876, 883, 887

[56] References Cited

U.S. PATENT DOCUMENTS 3,516,638  6/1970  Piggott ........................ 137/883 X

FOREIGN PATENT DOCUMENTS 1226645  3/1971  United Kingdom ............. 137/883

Primary Examiner—John Fox
Attorney, Agent, or Firm—Kenyon & Kenyon

[57] ABSTRACT

A distribution and shut-off device for hydraulic systems, particularly domestic water systems, comprises at least one main pipe section, an auxiliary pipe having an axis which is not coplanar with the axis of the main pipe section and leading at its ends to two distribution outlets, a passage which connects the main pipe section to the auxiliary pipe, and two valves for shutting off the flow of fluid towards the two distribution outlets. The first on-off valve is situated at the junction of the connecting passage with the auxiliary pipe. The valve is movable between an open position in which the two branches of the auxiliary pipe situated on the two sides of the valve communicate with each other and with the connection passage, and a closed position in which the connection between the two branches of the auxilary pipe is closed and the passage only communicates with the branch of the auxiliary pipe leading to the outlet with which the second on-off valve is associated.

4 Claims, 3 Drawing Sheets

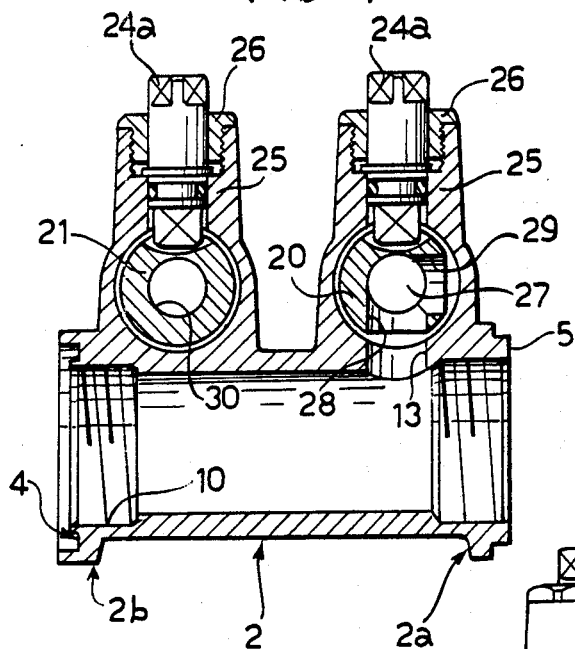
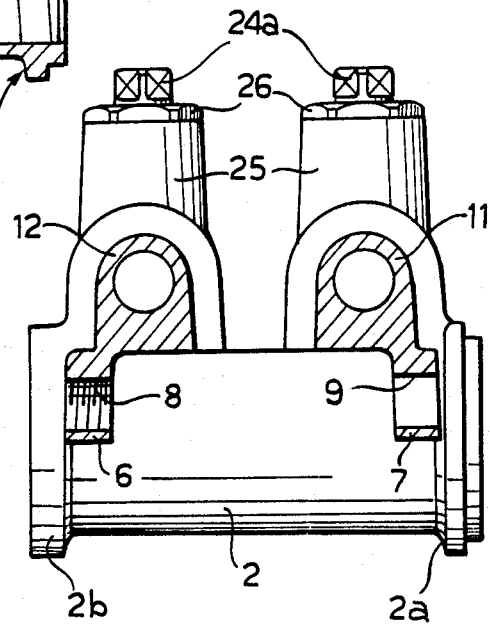
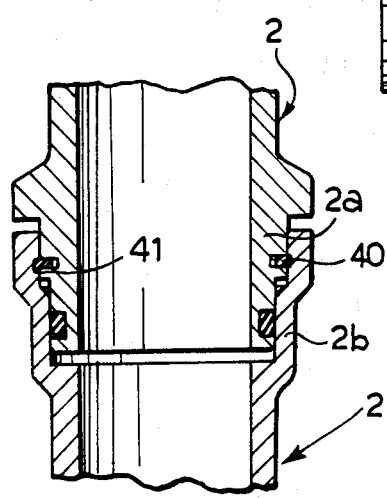

DISTRIBUTION AND SHUT-OFF DEVICE FOR HYDRAULIC SYSTEMS, PARTICULARLY FOR DOMESTIC WATER SYSTEMS

DESCRIPTION

The present invention relates to distribution and shut-off devices for hydraulic systems, particularly for domestic water systems, of known type having a body which comprises:

at least one main pipe section formed at each end so as to enable it to be coupled to the main pipe section of an identical device, to produce a continuous main pipe which is intended to be connected to a hydraulic network, at least one auxiliary pipe having an axis which is not coplanar with the axis of the main pipe section, and leading at its ends to two distribution outlets for connection to two user units, a passage which connects the main pipe section to the auxiliary pipe, and two valves for shutting off the flow of fluid towards the two distribution outlets.

Devices of the type indicated above are known and have been used for some time in domestic water systems. The main advantage of these devices lies in the fact that they enable any one user unit to be isolated, for example, for the carrying out of maintenance work, without interrupting the water supply to the other units.

The object of the present invention is to produce a distribution and shut-off device which is simple, functional and compact.

In order to achieve this object, the subject of the invention is a device of the type specified above, characterised in that a first shut-off valve is situated at the junction of the passage with the auxiliary pipe and is movable between an open position—in which the two branches of the auxiliary pipe situated on the two sides of the valve communicate with each other and with the connecting passage—and a closed position—in which the connection between the two branches of the auxiliary pipe is shut off and the passage only communicates with the branch of the auxiliary pipe leading to the distribution outlet with which the second shut-off valve is associated.

In a preferred embodiment, the device includes a second main pipe section parallel to the first main pipe section, a second auxiliary pipe parallel to the first auxiliary pipe and provided with two distribution outlets, a passage connecting the second main pipe section to the second auxiliary pipe, and two further valves for shutting off the flow of fluid towards the two outlets of the second auxiliary pipe. The two auxiliary pipes are contained in a plane parallel to and spaced form the plane of the two main pipe sections, the axes of the auxiliary pipes being perpendicular to the axes of the main pipe sections.

Figure 2:
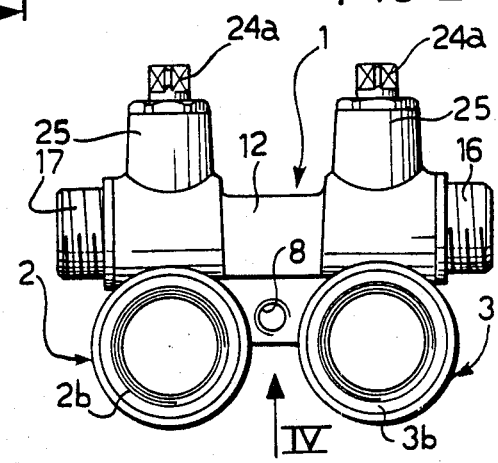
Figure 3:
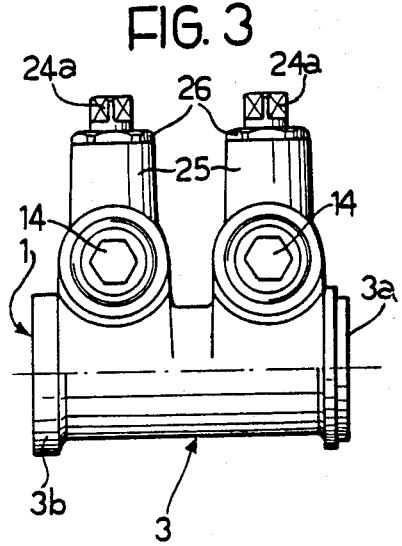
Figure 4:
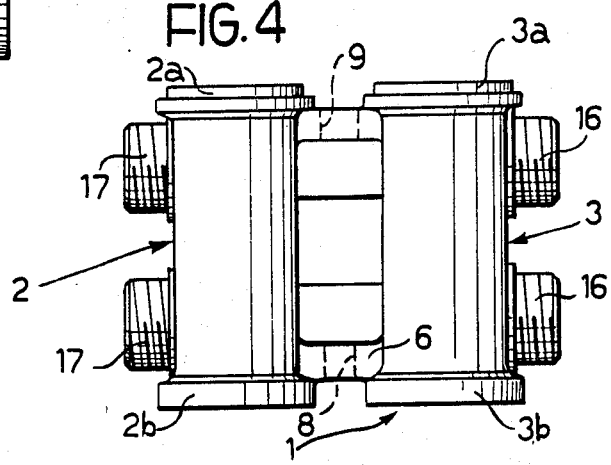
Figure 5:
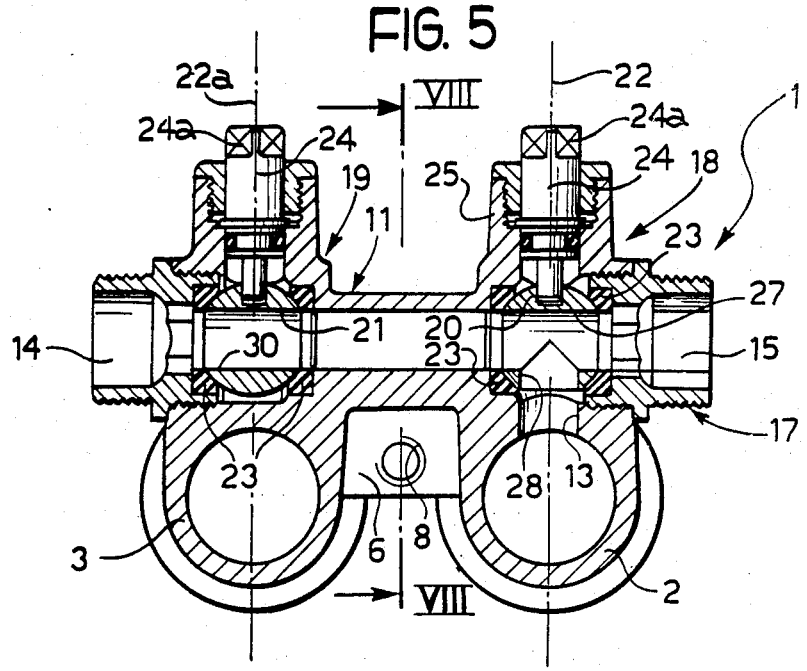
Figure 6:
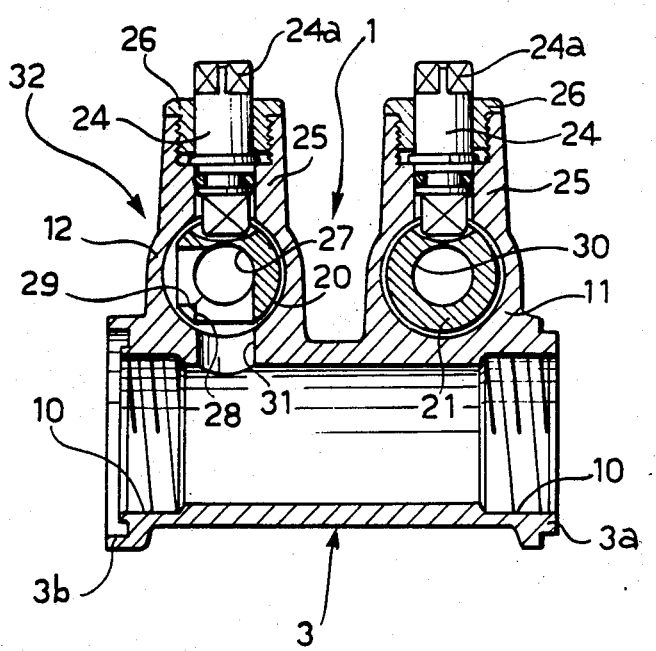

The invention will now be described with reference to the appended drawings, provided purely by way of non-limiting example, in which:

FIG. 1 is a plan view of a device according to the invention,

FIG. 2 is a view taken on the arrow II of FIG. 1,
FIG. 3 is a view taken on the arrow III of FIG. 1,
FIG. 4 is a view taken on the arrow IV of FIG. 2,
FIG. 5 is a section taken on the line V—V of FIG. 1,
FIG. 6 is a section taken on the line VI—VI of FIG. 1,
FIG. 7 is a section taken on the line VII—VII of FIG. 1,
FIG. 8 is a section taken on the line VIII—VIII of FIG. 5, and
FIG. 9 is a section which shows the rapid-engagement coupling means on an enlarged scale.

FIGS. 1 to 8 illustrate a distribution and shut-off device 1 for domestic water systems. The device 1 has metal body including two main pipe sections 2, 3. The pipe sections 2, 3 have ends 2a, 2b and 3a, 3b which are complementary in shape. Each end may be coupled to a pipe section of an identical device in order to produce two continuous main pipes which are connected to the cold-water distribution system and to the hot-water distribution system respectively. In the embodiment illustrated in FIGS. 1 to 8, the ends 2b, 3b are socket-shaped, whilst the ends 2a, 3a have an outer surface which corresponds to the inner surface of the socket-shaped ends to enable the joining of pipe sections belonging to different devices. The end 2b has an annular back wall 4 which is intended to constitute a seat for a rubber washer (not illustrated) which, in the coupled condition, is pressed by a annular front surface 5 of the end 2a of the other device. Still with reference to the particular embodiment illustrated, the body of the device includes two parallel and spaced-apart flanges 6, 7 (FIG. 8) extending between the two main sections 2, 3 and having two coaxial holes 8, 9, the first of which is threaded. The connection of the device illustrated to an identical device is achieved by means of screws, not illustrated, each of which passes through a hole 9 of one device and engages the adjacent threaded hole 8 of the other device. As already stated, it is possible to produce two continuous pipes by the coupling of a plurality of devices similar to that illustrated in FIG. 1. The need may arise to close, joint or reduce any of these pipes at one or at both ends. In order to make this possible, the inner surface of each of the pipe sections 2 and 3 has two threaded end portions 10. Each of these threaded portions can receive a threaded plug (not illustrated) for closing the pipe.

The body of the device 1 further includes two auxiliary pipes 11, 12 whose axes are perpendicular to the axes of the main pipe sections 2, 3. Moreover, the axes of the auxiliary pipes 11, 12 are contained in a plane parallel to and spaced from the plane containing the axes of the main pipe sections 2, 3.

With reference to FIG. 5, the auxiliary pipe 11 is constituted by a through-hole which passes through the body of the device and communicates with the main pipe 2 through a passage 13 whose axis is contained in a plane perpendicular to the axis of the pipe 2 and perpendicular to the axis of the auxiliary pipe 11. The opposite ends of the auxiliary pipe 11 lead to two outlets 14,15 defined by two threaded connectors 16, 17 intended for connection to piping for the supply of water to two different user units. The flow of water towards these units may be shut off by means of two on-off valves, generally indicated 18 and 19.

In the embodiment illustrated, the valves 18, 19 have valve members 20, 21 with spherical bodies. The valve member 20 of the valve 18 is situated at the junction of the passage 13 and the auxiliary pipe 11 and is supported for rotation about the axis 22 of this pipe by two rings 23 of plastics material, having spherical facing surfaces and located in seats formed in the inner wall of the body of the device and in the inner end of the threaded connector 17. The valve member 20 may be rotated by means of a pin 24 having a flattened end housed in a recess formed in the valve member 20. The pin 24 is mounted for rotation in a tubular appendage 25 of the body of the device and is retained axially within this appendage by a ring nut 26 screwed into the end of the latter. Finally, the pin 24 has an end 24a which projects from the appendage 25 and is shaped to fit an operating spanner.

The spherical member 20 has a diametral through-hole 27 perpendicular to the axis 22, a hole 28 coaxial with the axis 22 and extending from the hole 27 to open facing the passage 13, and a hole 29 (FIG. 7) whose axis is perpendicular both to the axis 22 and to the axis of the hole 27. The hole 29 extends from the hole 27 to open on the outer surface of the spherical body 20 (towards the observer, with reference to FIG. 5).

The valve 18 has an open position and a closed position. In the open position (illustrated in FIG. 5), the two branches of the auxiliary pipe 11 situated on the two sides of the valve 18 communicate with each other through the through-hole 27 and also communicate with the pipe section 2 through the passage 13 and the hole 18. In this condition, therefore, the water passing through the pipe 2 is free to reach the distribution outlet 15, as well as—if the valve 19 is open—the distribution outlet 14. As already mentioned, in the position illustrated in FIG. 5, the axis of the hole 29 is perpendicular to the plane of the sheet of the drawing and is directed towards the observer.

In the closed position, the valve member 20 is rotated through 90° from the position illustrated in FIG. 5. In this position, the hole 29 of the body 20 is aligned with the axis of the auxiliary pipe 11 and is directed towards the outlet 14. In this condition, therefore, the communication between the two branches of the auxiliary pipe 11 situated on the two sides of the valve 18 is shut off, whilst the pipe section 2 communicates only with the branch of the auxiliary pipe 11 which is directed towards the outlet 14, through the passage 13, the hole 28 and the hole 29. In this condition, therefore, the outlet 15 is isolated, whilst the water is free to reach the outlet 14 from the pipe 2 provided that the valve 19 is open.

The valve member 21 of the valve 19 is also supported for rotation about an axis 22a parallel to the axis 22 by two rings 23 and is also operated by a pin 24 identical to that described above for the valve 18. The valve member 21 has a single diametral through-hole 30 perpendicular to the axis 29. The valve member 21 has an open position (illustrated in FIG. 5) in which the hole 30 is aligned with the auxiliary pipe 11 to enable the water to flow freely to the outlet 14, and a closed position in which is it rotated through 90° from the open position and the outlet 14 remains isolated.

The auxiliary pipe 12 has a wholly similar conformation to that of the pipe 11 and communicates with the pipe section 3 through a passage 31 (FIG. 6). The flow of water towards the two distribution outlets of the auxiliary pipe 12 can be shut off by means of two valves 32, 33 having completely identical structures to those of the valves 18, 19. In FIG. 6, therefore, the parts which correspond to those of FIG. 5 are indicated by the same reference numerals.

As already mentioned several times, the device 1 is intended to be coupled to a plurality of similar devices to produce a distribution and shut-off unit. In the assembled unit, the various pipe sections 2 and 3 define two continuous main pipes which are intended to be connected to the cold-water supply system and to the hot-water supply system, respectively. Pairs of distribution outlets for connection to respective user units are then joined to each of these pipes. A corresponding on-off valve 18, 19, 32 or 33 is associated with each of these outlets and can be used to isolate that outlet. In this way, the respective user unit can be isolated from the system so as to enable, for example, maintenance work to be carried out, without thereby interrupting the water supply to the other units. With reference, for example, to the outlets 14 and 15 (see FIG. 5), a free flow to both the ends is achieved by arranging the valves 18 and 19 in the position illustrated. If it is wished to shut off the outlet 14 only, the valve 19 is rotated through 90°, whilst the valve 18 is left in the position shown. If only the outlet 15 is to be shut off, the valve 18 is rotated through 90° so as to direct the hole 29 towards the outlet 14 and the valve 19 is left in the position shown. If it is wished to isolate both the outlet 14 and 15, both the valves 18 and 19 are rotated through 90° from the positions illustrated.

Naturally, the principle of the invention remaining the same, the forms of embodiment and details of construction may be varied widely with respect to those described and illustrated purely by way of example.

For example, the device 1 could include a single main pipe (for example, the pipe section 2) and only the auxiliary pipe associated therewith. By the assembly of a plurality of devices of this type, therefore, it is possible to produce a distributor unit having two main pipes and a series of pairs of distribution outlets. Finally, it is also possible to provide a device whose body includes two main pipe sections, but only one auxiliary pipe communicating with only one of the two main pipe sections. Such a device may be assembled with identical devices and/or with devices of the type illustrated in FIG. 1, whenever there is a need to provide a different number of pairs of cold-water outlets from the number of pairs of hot-water outlets.

Finally, the couplings between the various devices may be achieved in a different manner from those described above. For example, it is possible to form the ends of each main pipe section so as to enable a rapid engagement of the complementary ends. With reference to FIG. 9, for example, the end 2b may be socket-shaped, whilst the end 2a of the adjacent device has an outer surface which is complementary in shape to the inner surface of the end 2b and is provided with a resilient ring 40 adapted to be snap-engaged in a circumferential groove 41 of the inner surface of the socket-shaped end 2b.

The shape of the valve member 20 may be different from that illustrated. For example, the member 20 have a spherical body.

I claim:

1. A distribution and shut-off device for hydraulic systems having a body which comprises:
    at least one main pipe section formed at each end so as to enable it to be coupled to the main pipe section of an identical device, to produce a continuous main pipe which is intended to be connected to a hydraulic network;
    at least one auxiliary pipe having an axis which is not coplanar with the axis of the main pipe section, and leading at its ends to two distribution outlets for connection to two user units;

a passage which connects the main pipe section to the auxiliary pipe;

two valves for shutting off the flow of fluid towards the two distribution outlets;

wherein a first said shut-off valve is situated at the junction of the passage with the auxiliary pipe and is movable between an open position in which the two branches of the auxiliary pipe situated on the two sides of the valve communicate with each other and with the connecting passage, and a closed position in which the connection between the two branches of the auxiliary pipe is shut off and the passage only communicates with the branch of the auxiliary pipe leading to the outlet with which the second shut-off valve associated;

a second main pipe section parallel to the first main pipe section, a second auxiliary pipe parallel to the first auxiliary pipe and provided with two further distribution outlets, a passage connecting the second pipe section to the second auxiliary pipe, and two further valves for shutting off the flow of fluid towards the two further distribution outlets, the further shut-off valves being formed and arranged identically to the two shut-off valves associated with the first auxiliary pipe;

wherein the axes of the two auxiliary pipes are contained in a plane parallel to and spaced from the plane of the two main pipe sections, and axes of the auxiliary pipes are perpendicular to the axes of the main pipe sections; and the first shut-off valve having a valve member with a spherical body mounted in the body of the device for rotation about an axis perpendicular to the axis of the auxiliary pipe, and the valve member defining a first diametral hole which passes through the valve member in a direction perpendicular to the axis of rotation, a second hole which has an axis coincident with the axis of rotation and which extends from the first hole and opens facing the connecting passage, and a third hole which has an axis perpendicular both to the axis of the first hole and to the axis of the second hole and which extends from the first hole and opens on the external surface of the valve member.

2. A device according to claim 1, wherein the second shut-off valve includes a rotatable valve member defining a diametral through-hole with an axis perpendicular to the axis of rotation.

3. A device according to claim 1, wherein the ends of the main pipe section have rapid-engagement coupling means for connection to the main pipe section of an adjacent device.

4. A device according to claim 3, wherein the two ends of the main pipe section have complementary shapes so as to enable the formation of a spigot-and-socket joint between the adjacent ends of two identical devices, one of the ends having a resilient ring on its outer surface which is adapted to snap-engage in a circumferential groove provided in the inner surface of the adjacent complementary end of an identical device.

* * * * *